United States Patent [19]

Hübner et al.

[11] Patent Number: 4,865,413
[45] Date of Patent: Sep. 12, 1989

[54] ARRANGEMENT FOR SPLICING OPTICAL WAVEGUIDES AND METHOD OF MANUFACTURING SAME

[75] Inventors: Horst H. Hübner, Nümbrecht; Bernhard N. A. Lersmacher, Aachen, both of Fed. Rep. of Germany

[73] Assignee: U.S. Philips Corp., New York, N.Y.

[21] Appl. No.: 9,446

[22] Filed: Feb. 2, 1987

[30] Foreign Application Priority Data

Feb. 25, 1986 [DE] Fed. Rep. of Germany ....... 3605966

[51] Int. Cl.$^4$ .............................................. G02B 6/38
[52] U.S. Cl. ............................ 350/96.21; 350/96.22; 264/1.1; 264/29.1; 264/328.8
[58] Field of Search ................ 350/96.2, 96.21, 96.22; 264/328.8, 1.1, 1.5, 2.6, 29.1

[56] References Cited

U.S. PATENT DOCUMENTS

| | | | |
|---|---|---|---|
| 3,864,018 | 2/1975 | Miller | 350/96 |
| 4,029,390 | 6/1977 | Chinnock et al. | 350/96 |
| 4,046,454 | 9/1977 | Pugh, III | 350/96 |
| 4,088,386 | 5/1978 | Hawk | 350/96 |
| 4,353,782 | 10/1982 | Lersmacher | 201/25 |
| 4,444,460 | 4/1984 | Stowe | 350/96.2 X |
| 4,626,569 | 12/1986 | Waitkus et al. | 264/328.8 X |
| 4,657,341 | 4/1987 | Sammueller | 350/96.22 |
| 4,735,482 | 4/1988 | Yoshida et al. | 350/96.2 |

FOREIGN PATENT DOCUMENTS

| | | | |
|---|---|---|---|
| 56-113114 | 9/1981 | Japan . | |
| 59-189304 | 10/1984 | Japan | 350/96.22 |
| 59-222805 | 12/1984 | Japan . | |
| 60-214310 | 10/1985 | Japan | 350/96.22 |
| 1449156 | 9/1976 | United Kingdom . | |
| 2151040 | 7/1985 | United Kingdom | 350/96.21 |

OTHER PUBLICATIONS

Hartline, E. F., et al., "Interconnection for Lightguide Fibers," *The Western Electric Engineer*, Winter 1980, pp. 97–101.

*Primary Examiner*—John D. Lee
*Assistant Examiner*—John Ngo
*Attorney, Agent, or Firm*—William L. Botjer

[57] ABSTRACT

The arrangement comprises a carrier (1) having fibre-guiding grooves (2), which carrier is made of glass-like carbon. In the manufacture of the carrier the fibre-guiding grooves are formed in a cured phenol-resin body preferably by means of an extrusion die whose shape corresponds to that of the fibre-guiding grooves to be formed. The phenol-resin body thus formed is converted into the glass-like carbon carrier by carbonization.

9 Claims, 1 Drawing Sheet

ARRANGEMENT FOR SPLICING OPTICAL WAVEGUIDES AND METHOD OF MANUFACTURING SAME

BACKGROUND OF THE INVENTION

The invention relates to an arrangement for slicing a first group of optical waveguides of the glassfibre type with a second similar group, comprising a carrier with fibre-guiding grooves. The invention further relates to a method of manufacturing said carrier.

In known arrangements of the type mentioned in the opening paragraph, the carrier consists of silicon (DE 23 45 273, US 40 46 454, The Western Electric Engineer (Winter 1980) 96-101), gallium phosphide or gallium arsenide (DE 23 45 273), metal (DE 24 49 359, DE 25 57 660, US 40 46 454), synthetic resin (DE 25 29 267, DE 25 57 660), glass (JP 56 113 114) or a sintered body of silicon dioxide and silicoan carbide (JP 59-222 805).

For connecting (splicing) the ends of two or more optical waveguides of the glass-fibre type, in particular quartz-glass fibres, an accurate positioning and fixing of the ends in the relative grooves, troughs, slots or channels is necessary. In the case of silicon carriers the grooves are formed by subjecting silicon single-crystals to a high-accuracy etching process. However, this process is time-consuming and, consequently, costly. The same applies to gallium phosphide and gallium arsenide carriers.

The use of metals as carrier materials has the disadvantage that either their coefficient of expansion is not readily compatible with that of glass or that the manufacture is very difficult.

The use of synthetic resins as carrier materials has the disadvantage that their coefficient of expansion differs from that of glass by several orders of magnitude. Moreover, their resistance to ambient influences is limited.

The use of glass as a carrier material has the disadvantage that the subsequent provision of fibre-guiding grooves takes a lot of effort.

The use of sintered bodies from silicon dioxide and silicon carbide as carriers has the disadvantage that in order to obtain a high geometrical accuracy an intricate process is required which adversely affects the applicability of mass-production techniques.

SUMMARY OF THE INVENTION

It is an object of the invention to provide a corrosion-resistant, mechanically stable carrier for splicing optical waveguides, which can readily be manufactured, whose coefficient of expansion is of the order of that of glass, and whose surfaces are smooth and accurately defined as is necessary for positioning the fibres.

This object is achieved in accordance with the invention by a glass-like carbon carrier which is provided with fibre-guiding grooves.

The geometry of the fibre-guiding grooves is not limited to one particular profile. Examples of suitable profiles are triangular or V-shaped, trapezium and rectangular, semi-circular or bead-shaped profiles.

Glass-like carbon, its manufacture and properties are described in, for example, DE 28 43 676 in which glass-like carbon is manufactured by a solid-body pyrolysis of hardenable, cured synthetic resins, for example phenol resins, i.e. bodies of such a synthetic resin are introduced into a reaction vessel and are subjected to a predetermined temperature/time process in a non-oxidizing atmosphere. This results in a carbonization of the synthetic resin.

The manufacture of the carrier is preferably carried out so that the fibre-guiding grooves are formed in the surface of a cured phenol-resin body, after which the phenol resin body thus formed is converted into the glass-like carbon carrier by a carbonizing process, i.e. by carbonization.

The fibre-guiding grooves are formed in, for example, a mechanical process, such as milling, or in a casting process. It is very advantageous to form the fibre-guiding grooves in said phenol-resin body by means of an extrusion or stamping die which is shaped so as to correspond to the desired profile.

Phenol resins which are very suitable for this extrusion or stamping process are preferably not cured to the extent that they are as brittle as glass, but instead retain a certain degree of viscosity which at higher temperatures (approximately from 50° C. to 120° C.) and pressures from 10 to 100 kg/cm$^2$ allows for a permanent plastic deformation. Subsequently, the preformed phenol-resin bodies are converted to glass-like carbon according to known methods.

In order to prevent warpage of the phenol resin body during the carbonization process, the body may be provided with strengthening profiles and/or inserts.

In a modified embodiment of the method in accordance with the invention, the fibre-guiding grooves are formed in fully carbonized bodies of glass-like carbon, for example, by grinding or spark erosion. This method has the advantage that the problems of dimensional accuracy and warpage due to shrinkage, which are side-effects of the carbonization process, are precluded. Consequently, measures such as the provision of strengthening members or profile which counteract faulting can be omitted in many cases.

The advantages of carriers of glass-like carbon are essentially as follows:

a) Carriers having a large surface area can be manufactured, for example having dimensions of from 20 mm×50 mm to 60 mm×120 mm. This means that more fibres can be positioned in the grooves and that the distance over which they are accommodated in the grooves is longer.

b) At normal temperature (up to approximately 350° C.) glass-like carbon is substantially completely corrosion-resistant.

c) Raw material and material processing are very cheap; the carriers are suitable for mass production.

d) Glass-like carbon can be provided with entirely smooth, polished surfaces, consequently, damage to the fibres due to surface roughnesses can be largely avoided.

e) In addition to straight channels, curved channels such as branched profiles may be produced, which is impossible with the method in which silicon crystals are etched.

f) With $\alpha = 2.5$ to $3.0 \times 10^{-6}$, the thermal coefficient of expansion is almost equal to that of silicon, but glass-like carbon has the additional advantage of total isotropy.

BRIEF DESCRIPTION OF THE DRAWING

The invention will be explained in more detail with reference to a drawing, in which.

DESCRIPTION OF THE PREFERRED EMBODIMENTS

Figure 1:
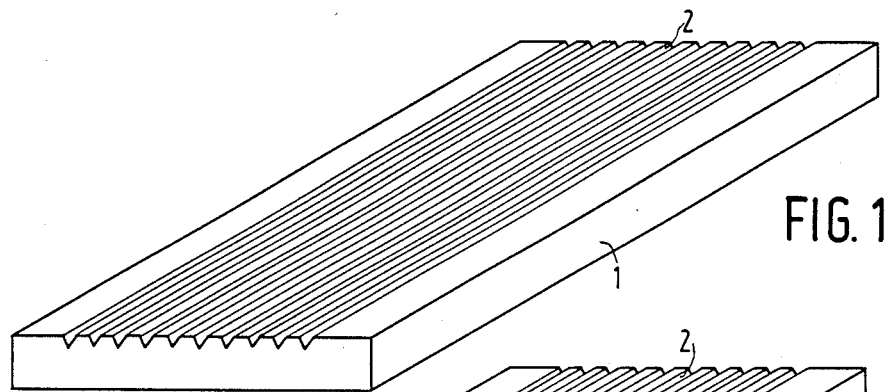
FIG. 1 is a carrier of an arrangement for splicing optical waveguides.

FIG. 1 represents a rectangular carrier 1 of glass-like carbon, which is provided at its upper side with V-shaped grooves or slots 2.

Figure 2:
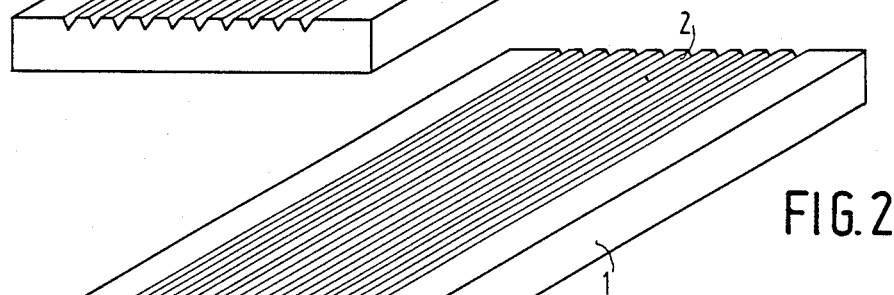
FIG. 2 is a carrier as shown in FIG. 1, however, it is provided with a stengthening profile.

FIG. 2 represents a carrier 1 whose lower side is provided with a strengthening profile 3. The profile 3 is formed in the phenol-resin body by, for example, corresponding extrusion dies or by a casting process, or in the carrier 1 by a mechanical process, for example milling.

Figure 3:
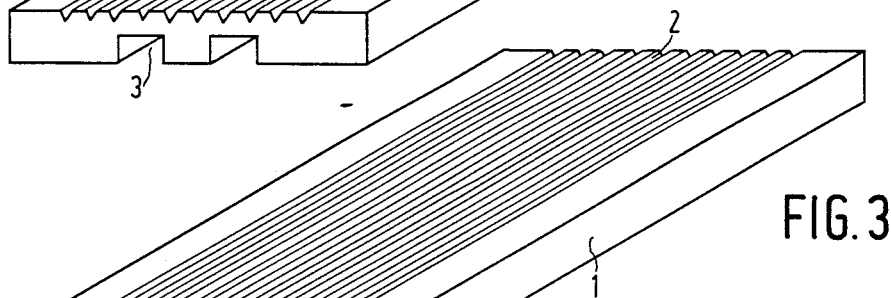
FIG. 3 is a carrier as shown in FIG. 1, however, it is provided with strengthening inserts.

FIG. 3 represents a carrier which is connected to metal strengthening pins 4. The pins are provided in the carrier prior to the carbonization process. The strengthening pins which are made of, for examaple, steel, hardmetal, glass or ceramics are so dimensioned that the (linear) shrinkage of approximately 20 to 25% as a consequence of carbonization is not hampered, i.e. advantageously, the diameter of the strengthening inserts is approximately 20 to 25% smaller than the diameter of the receiving channels (apertures or bores) in the phenol-resin body.

Figure 4:
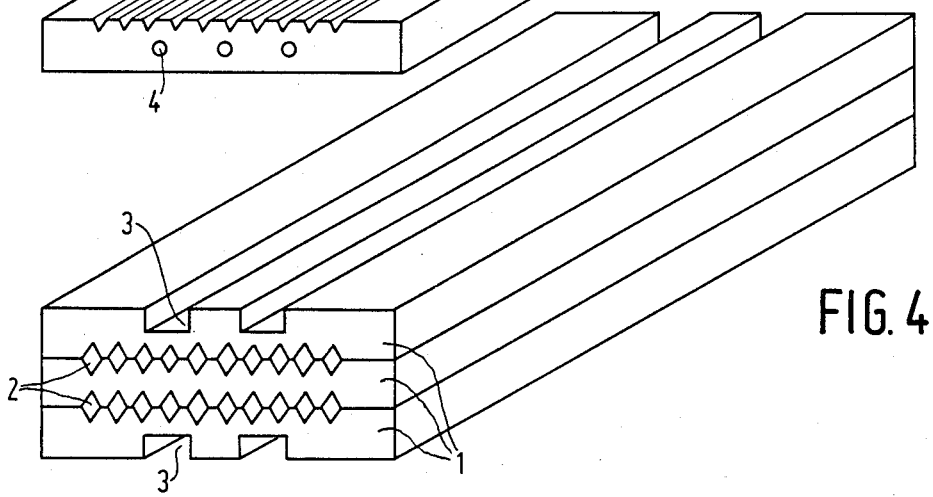
FIG. 4 is a stack of various carriers.

FIG. 4 represents a stack of carriers 1 which are provided on both sides with V-shaped grooves or slots 2.

In order to form the fibre-guiding grooves in a non-brittle cured phenol-resin body, a precision stamping die was used. This die consisted of high-carbon steel in which a groove profile of 10 approximately trapezium-shaped grooves was formed by spark erosion. The depth of the grooves was 45 μm, the width of the grooves at the surface was 120 μm and at the bottom, or inside the groove 20 μm. The length of the stamping die was 40 mm. Subsequently, the surface of the die was provided with a 2 μm thick layer of TiN by means of a chemical vapour deposition (CVD) process. Thus, a high resistance to wear and, consequently, constancy of profile are guaranteed even when it is used intensively.

What is claimed is:

1. A device for splicing at least first and second optical fibers to each other, said fibers having coefficients of thermal expansion which are substantially equal to each other, said device comprising a carrier having first and second opposite surfaces, said carrier having at least one groove in the first surface for accommodating the first and second optical fibers, said carrier consisting essentially of glass-like carbon, said carrier having a coefficient of thermal expansion substantially equal to the coefficient of thermal expansion of the first and second optical fibers and at least one strengthening pin arranged in the carrier substantially parallel to the groove in the first surface.

2. A device as claimed in claim 1, characterized in that the carrier has at least one strengthening profile in the second surface arranged substantially opposite the groove in the first surface.

3. An optical fiber splice comprising:
   a first optical fiber having a coefficient of thermal expansion;
   a second optical fiber having a coefficient of thermal expansion which is substantially equal to the coefficient of thermal expansion of the first optical fiber;
   a carrier having first and second opposite surfaces, said carrier having at least one groove in the first surface for accommodating the first and second optical fibers, said carrier consisting essentially of glass-like carbon, said carrier having a coefficient of thermal expansion substantially equal to the coefficient of thermal expanmsion of the first and second optical fibers; and
   at least one strengthening pin arranged in the carrier substantially parallel to the groove in the first surface.

4. A device as claimed in claim 1 or 3, wherein said strengthening pin is constructed from materials selected from the group consisting of steel, hardmetal, glass or ceramics.

5. A method of manufacturing a device for splicing at least first and second optical fibers to each other, said fibers having coefficients of thermal expansion which are substantially equal to each other, said method comprising the steps of:
   forming a phenol-resin carrier having first and second opposite surfaces; p1 forming at least one groove in the first surface of the carrier;
   providing an aperture in said carrier, said aperture being disposed substantially parallel to the longitudinal axis of said carrier.
   disposing a strengthening pin in said aperture in said carrier, the diameter of said pin being less than that of said aperture to compensate for the shrinkage in the carbonizing step, and
   carbonizing the grooved carrier to convert the carrier substantially into glass-like carbon having a coefficient of thermal expansion substantially equal to the coefficient of thermal expansion of the first and second optical fibers.

6. A method as claimed in claim 5, characterized in that prior to forming the groove in the carrier, the method comprises the step of curing the carrier.

7. A method as claimed in claim 6, characterized in that the groove is formed by extruding the carrier through an extrusion die.

8. A method of manufacturing a device for splicing at least first and second optical fibers to each other, said fibers having coefficients of thermal expansion which are substantially equal to each other, said method comprising the steps of:
   forming a phenol-resin carrier having first and second opposite surfaces;
   providing an aperture in said carrier, said aperture being disposed substantially parallel to the longitudinal axis of said carrier,
   disposing a strengthening pin in said aperture in said carrier, the diameter of said pin being less than that of said aperture to compensate for the shrinkage in the carbonizing step,
   curing the carrier;
   carbonizing the cured carrier to convert the carrier substantially into glass-like carbon having a coefficient of thermal expansion substantially equal to the coefficient of thermal expansion of the first and second optical fibers; and
   forming at least one groove in the first surface of the carbonized carrier.

9. The method of manufacturing as claimed in claim 5 or 8, wherein the diameter of the strengthening pin is approximately 20–25% smaller than that of the aperture prior to the carbonizing step.

* * * * *